UNITED STATES PATENT OFFICE.

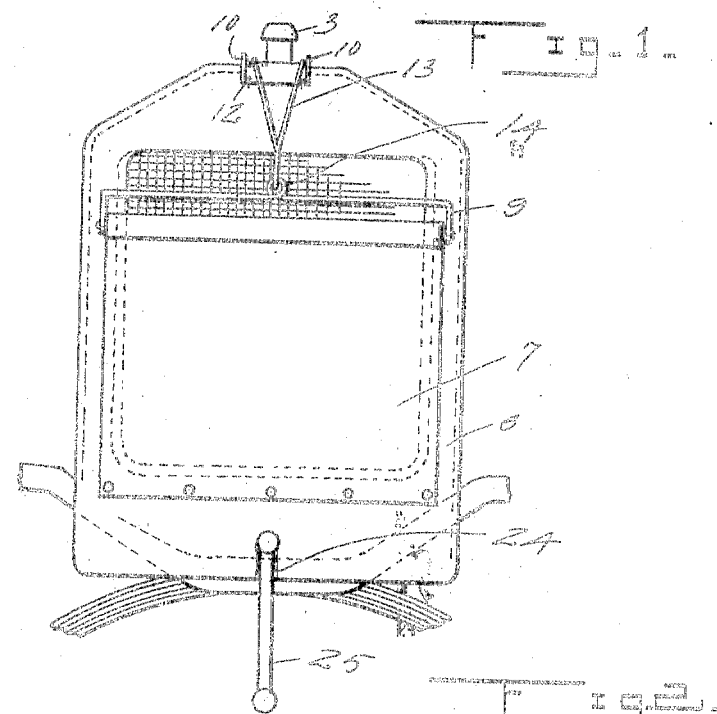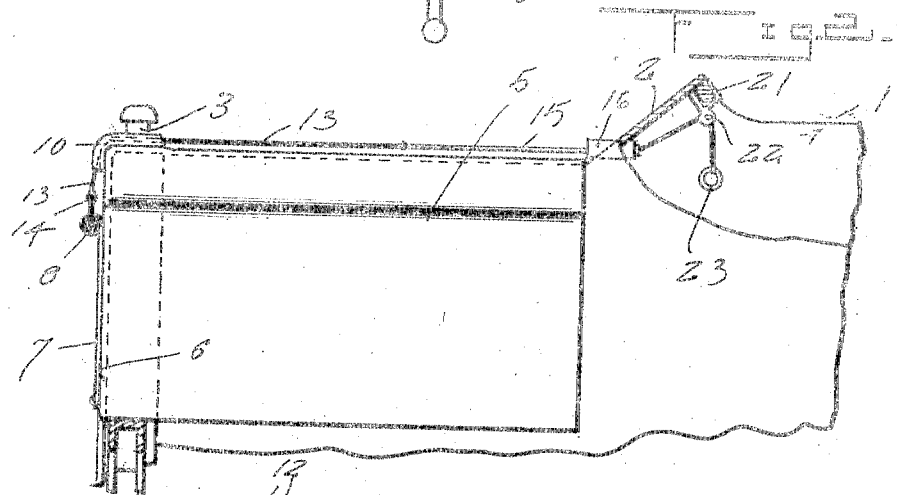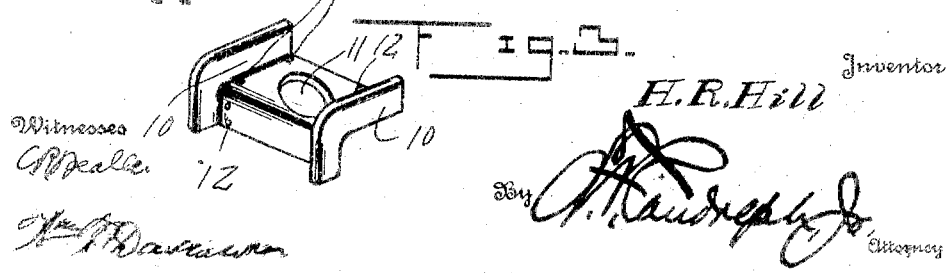

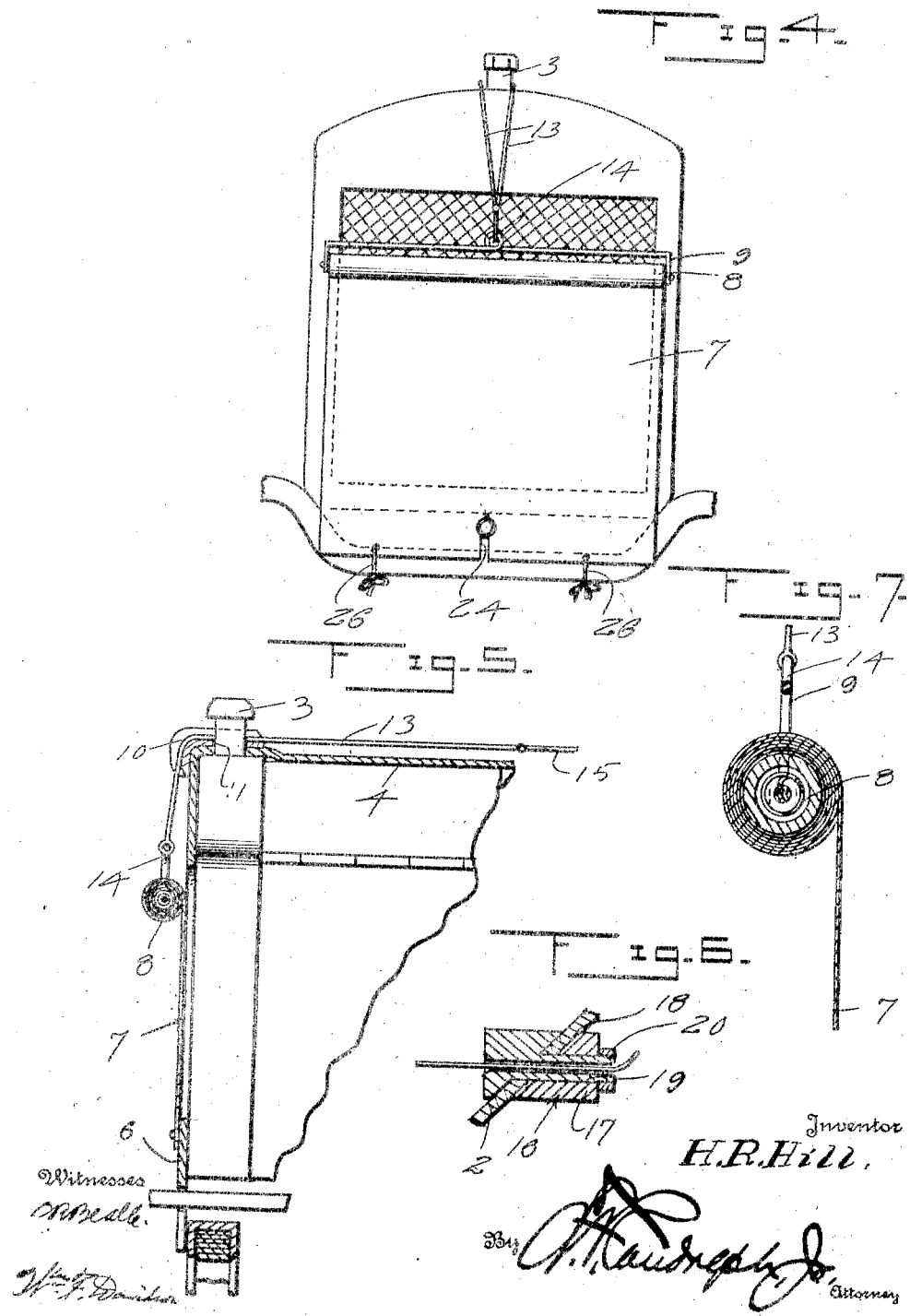

HERBERT R. HILL, OF EXETER, NEBRASKA.

AUTOMOBILE-RADIATOR CURTAIN.

1,334,270.

Specification of Letters Patent.

Patented Mar. 16, 1920.

Application filed February 21, 1918. Serial No. 218,563.

*To all whom it may concern:*

Be it known that I, HERBERT R. HILL, a citizen of the United States, residing at Exeter, in the county of Fillmore and State of Nebraska, have invented certain new and useful Improvements in Automobile-Radiator Curtains; and I do hereby declare the following to be a full, clear, and exact description of the invention, such as will enable others skilled in the art to which it appertains to make and use the same.

This invention relates to improvements in automobile radiator curtains and has for one of its objects the provision of a device of this character whereby the curtain may be opened and closed or partially opened when desired from a point at the driver's seat of the automobile so that the engine can be conveniently kept at a correct temperature at all times.

Another object of this invention is the provision of a curtain of the above stated character, which can be used with an ordinary hood cover or used alone on the radiator, and which shall be simple, durable, and efficient, and which can be manufactured and sold at a comparatively low cost.

With these and other objects in view, as will become more apparent as the description proceeds, the invention consists in certain novel features of construction, combination, and arrangement of parts, as will be hereinafter more fully described and claimed.

For a complete understanding of my invention, reference is to be had to the following description and accompanying drawings, in which:—

Figure 1 is a front elevation of an automobile radiator curtain constructed in accordance with my invention, Fig. 2 is a side elevation partly in section of the same, Fig. 3 is a perspective view of a wear plate, Fig. 4 is a front elevation of a modified form of curtain, Fig. 5 is a fragmentary vertical sectional view of the preferred form of my invention, Fig. 6 is a detail sectional view of a bushing, and Fig. 7 is a sectional view of the curtain.

Referring in detail to the drawing, the numeral 1 indicates the body of an automobile having the usual dash 2, and radiator 3. The dash 2 and the radiator 3 are connected by the usual hood 4 that overlies the engine of the automobile. The foregoing description relates to a well known construction of automobile and to which my invention is applied.

A hood cover 5 is positioned over the hood 4 and the top and sides of the radiator 2 and has a front portion 6 that overlies the front of the radiator leaving an opening therein so that air may pass into or through the radiator for the purpose of cooling the same. A curtain 7 is secured to the lower edge of the front portion 6 of the hood cover 5 and is rolled upon a spring roller 8, which is of the ordinary tension type having the usual pintle ends adapted to be received in the ends of a bail 9. One of the ends of the bail 9 is provided with a slot while the opposite end is provided with an aperture to correspond with the usual pintle of a spring roller. A substantially L-shaped wear plate 10 is provided with an opening 11 to receive the filling spout of the radiator 3 and is secured to the hood cover 5 by any suitable means such as stitching passing through the aperture 12. The substantially L-shaped wear-plate 10 has upstanding flanges formed thereon for the purpose of guiding cords 13 that are disposed upon each side of the filling spout of the radiator and connected to the eye 14 of the bail 9. The cords have their opposite ends connected to a cord 15.

A bushing 16 consisting of a pair of sections 17 have their abutting edges beveled as illustrated at 18 to conform to the contour of the dash 2. The dash 2 is provided with an opening to receive an extension 19 that is formed upon one of the sections of the bushing 16 and which extends through the other section and is screw threaded to receive a lock nut 20. The extension 19 is of hollow formation so that the cord 15 may pass freely therethrough. A bracket 21 is secured to the dash in any suitable manner and has journaled thereto a cord gripping roller 22 which is adapted to grip the cord 15 when the end of said cord is moved laterally thereof for the purpose of holding the cord against accidental movement. The cord 15 has secured to the extreme free end a ring or suitable handle 23 so that the same can be conveniently gripped by the operator.

In operation, when it is desired to close the front of the radiator 3, the cord 15 is pulled so that the bail 9 is raised upwardly. As the bail 14 moves upwardly in front of the radiator, the curtain 7 unrolls and covers the opening of the radiator thereby protecting the radiator as well as the engine of the automobile. The lower end of the radiator 7 is provided with an opening or slot 24 so as to receive the usual crank handle 25 of the automobile.

Referring to my modified form of invention, as disclosed in Fig. 4, the hood cover and the wear plate are omitted, and the curtain is secured directly to the chassis or frame of the automobile by springs 26 so that the lower edge of the curtain is held permanent while the roller and the bail may be moved upwardly in front of the radiator to close the same whenever desired.

While I have shown and described the preferred embodiment of my invention, it will be understood that minor changes in construction, combination, and arrangement of parts may be made without departing from the spirit and scope of the invention as claimed.

Having thus described my invention, what I claim is:—

A device of the character set forth including a radiator having a filling spout and a hood cover having an opening receiving the spout, a spring-wound curtain connected to the hood, a wear plate having an opening receiving the spout and said plate being curved to rest against the front and top walls of the radiator to hold the cover thereon, flanges formed on the side edges of said plate, and an operating cord connected to the curtain and passing over the plate and prevented from disengaging the same by the flanges.

In testimony whereof I affix my signature in presence of two witnesses.

HERBERT R. HILL.

Witnesses:
J. B. KLUTZ,
BEN G. WORTHING.